United States Patent [19]

Garrett et al.

[11] Patent Number: 5,118,331
[45] Date of Patent: Jun. 2, 1992

[54] GAS TREATMENT OR SEPARATION APPARATUS

[75] Inventors: Michael E. Garrett, Woking; Piotr J. Sadkowski, Ash, both of England

[73] Assignee: The BOC Group plc, Windlesham, England

[21] Appl. No.: 735,211

[22] Filed: Jul. 24, 1991

[30] Foreign Application Priority Data

Jul. 26, 1990 [GB] United Kingdom ............... 9016415

[51] Int. Cl.⁵ .............................................. B01D 53/04
[52] U.S. Cl. ........................................ 55/269; 55/387; 55/475
[58] Field of Search .................... 55/267–269, 55/387, 389, 475; 210/350, 351

[56] References Cited

U.S. PATENT DOCUMENTS

| | | | |
|---|---|---|---|
| 2,389,225 | 11/1945 | Wieczorek, Jr. et al. | 55/387 |
| 2,988,222 | 6/1961 | Hagdahl | 210/350 |
| 3,598,539 | 8/1971 | Pizzato | 55/389 X |
| 3,708,072 | 1/1973 | Schmidt, Jr. | 210/350 X |
| 3,838,977 | 10/1974 | Warren | 55/475 X |
| 3,990,858 | 11/1976 | O'Sullivan et al. | 55/387 X |
| 4,194,891 | 3/1980 | Earls et al. | 55/26 |
| 4,250,035 | 2/1981 | McDonald et al. | 210/351 X |
| 4,337,153 | 6/1982 | Prior | 210/350 X |
| 4,560,393 | 12/1985 | Way | 55/389 X |
| 4,576,614 | 3/1986 | Armond et al. | 55/58 X |
| 4,764,346 | 8/1988 | Lewis et al. | 55/387 X |
| 4,997,465 | 3/1991 | Stanford | 55/475 X |
| 5,002,596 | 3/1991 | Maskaitis et al. | 55/387 |

FOREIGN PATENT DOCUMENTS

| | | | |
|---|---|---|---|
| 2950983 | 4/1980 | Fed. Rep. of Germany | 55/387 |
| 54-125179 | 9/1979 | Japan | 55/387 |
| 55-042845 | 11/1980 | Japan | 210/350 |
| 01-066461 | 3/1989 | Japan | 55/387 |
| 2082082 | 3/1982 | United Kingdom | 55/387 |

Primary Examiner—Robert Spitzer
Attorney, Agent, or Firm—Robert I. Pearlman; Coleman R. Reap

[57] ABSTRACT

A gas treatment or separation apparatus includes a vessel (2) containing a bed (18) of particulate material. Within the bed (18) there is located a plurality of distensible hollow members (30) each capable of being placed in communication with a source of fluid under pressure. The members (30) restrain movement of the particulate material.

9 Claims, 1 Drawing Sheet

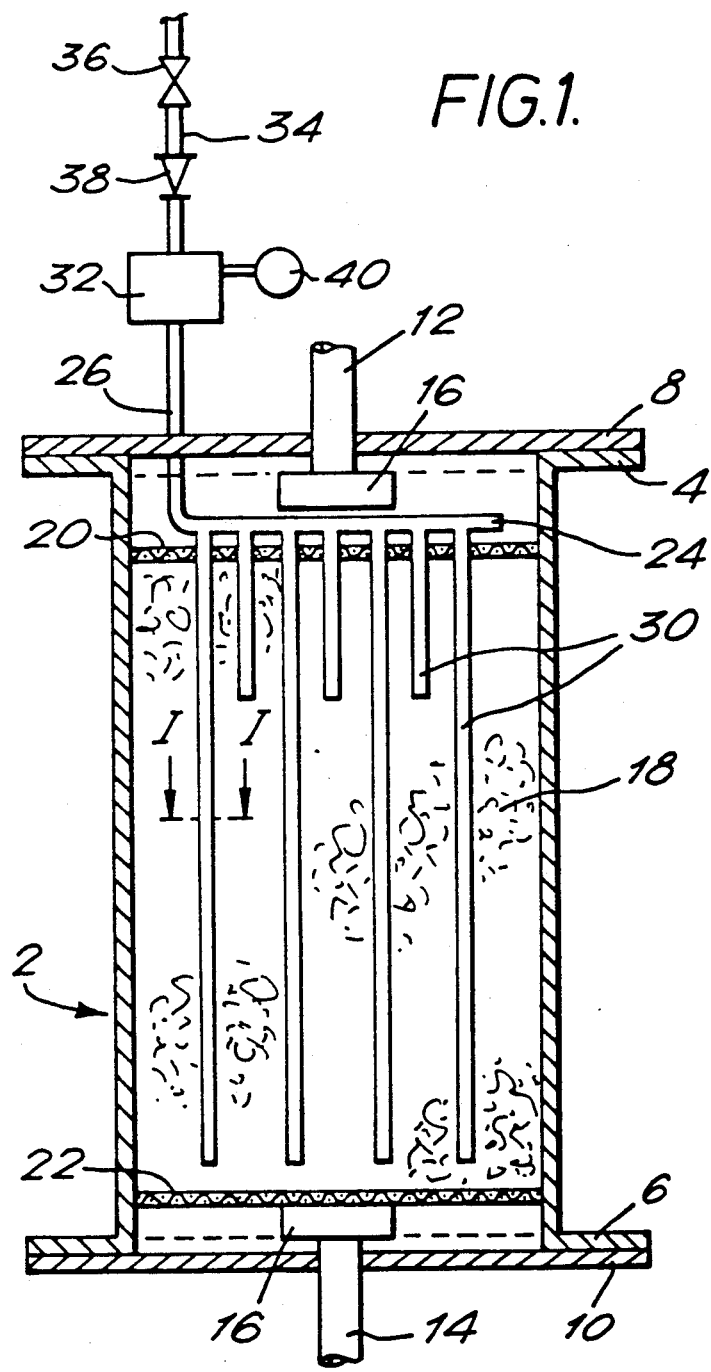

GAS TREATMENT OR SEPARATION APPARATUS

BACKGROUND OF THE INVENTION

The present invention relates to gas treatment or separation apparatus of the kind that includes a vessel containing a bed of particulate material. Such vessels are used throughout the chemical industry to perform a wide range of different operations. For example, the bed may comprise particles of catalyst and the bed may therefore be used to perform a catalytic reaction amongst components of the gas or gas mixture entering the vessel. In another example, the bed may comprise particles of an adsorbent adapted selectively to remove one or more components of the gas or gas mixture. Such vessels find a wide spread use in gas purification and separation processes. A particular example of such a gas separation process is pressure swing adsorption.

In a pressure swing adsorption process, an incoming gas mixture at a relatively high pressure is passed through a bed of molecular sieve adsorbent which selectively absorbs one or more components from the gas mixture, and a resulting non adsorbed product gas is withdrawn from the bed at a pressure only a little below the pressure of the incoming gas mixture. It will be appreciated that during the adsorption, the molecular sieve will become fully loaded with the selectively adsorbed components with the result that unless the adsorption is ended, the product gas will become progressively more contaminated with these components. At the end of the adsorption, therefore, the bed is regenerated by having the pressure therein reduced. The pressure reduction causes the previously adsorbed components to be desorbed and the resulting desorbed gas is conducted out of the bed. The bed is then ready to resume its role in separating the incoming gas mixture. Typically, two or more such beds are used in appropriate phase relationship with one another so as to minimise or eliminate periods of time in which the incoming gas mixture is not being separated in one vessel or another. Typically, in such pressure swing adsorption processes the incoming gas is compressed to a pressure in the range of 2 to 10 atmospheres absolute and each adsorption step takes at least ⅔ of a minute to perform. When it is desired to separate a nitrogen product from air, carbon molecular sieve is typically used as the molecular sieve, whereas when it is desired to separate an oxygen product from air, a zeolite molecular sieve is used. In order to improve upon commercial processes for separating oxygen from air, it has been proposed to reduce the duration of each adsorption step from more than 45 seconds to typically less than 10 seconds. Special zeolites have been developed to enable such a change to be made to the pressure swing adsorption process. Examples of such "fast cycling" pressure swing adsorption processes are given in U.S. Pat. No. 4 576 614 (corresponding to GB 2 091 121A) and U.S. Pat. No. 4 194 891. One of the consequences of adopting a "fast cycling" PSA process is that the velocity of gas flow through each adsorbent bed tends to be relatively high. In addition, the average particle size of the zeolite adsorbent tends to be smaller than that of the zeolites adapted for use in more conventional PSA processes in which each adsorption step takes in the order of a minute or more to perform. Both these factors lead to problems of localised fluidisation of the bed which in turn can cause attrition of the sieve and hence the formation of dust. Such dust particles are then carried out in the gas mixture and can become lodged in operating valves. There is therefore a decline in the performance of the adsorption bed in which severe cases may be sufficient to cause the process to fail to meet its design performance and also a risk of the dust particles hampering effective operation of valves associated with the adsorbent vessels.

In U.S. Pat. No. 4 576 614 there is disclosed a means for counteracting this tendency for the adsorbent bed to be fluidised. Pressure is exerted on the top of each bed by means of an upper grid or plate loaded by means of compression springs. Since adsorption beds in pressure swing adsorption processes tend to be generally columnar in shape, a relatively high compressive force is exerted by these plates on a relatively small surface area of sieve. Accordingly, there is a tendency for the sieve at the top of the bed to be crushed and as a result the sieve may be damaged.

The above description of the kind of problem that arises in a "fast cycling" pressure swing adsorption process is intended to be illustrative of the kind of problems that arise in operating beds of particulate material. Other problems that can arise include the tendency of the bed to "settle" over a period of time thereby giving rise to the bed having an uneven height with the result that the gas will try to flow more through some parts of the bed than others and hence the bed will not be efficiently utilised.

SUMMARY OF THE INVENTION

It is an aim of the present invention to provide a gas treatment or separation apparatus including a vessel containing a bed of particulate material which has means for better restraining the particulate material.

According to this invention there is provided gas treatment or separation apparatus including at least one vessel which contains a bed of particulate material and which has at least one gas inlet and at least one gas outlet, wherein the bed receives a plurality of distensible hollow members extending generally longitudinally of the bed, said members being able to be placed in communication with a source of fluid under pressure.

The distensible members are preferably pressurised to a pressure at least as great as the maximum pressure that obtains in the bed during its operation. Preferably in the example of an apparatus for separating a gas mixture by pressure swing adsorption which includes a compressor to compress the incoming gas mixture, the distensible members communicate directly with the outlet of the compressor. Accordingly, the distensible members are always at a pressure at least that of the maximum that obtains within the vessel. Indeed, having regard to the pressure drop in the apparatus, it is likely that pressure in the distensible members will always be in excess of the maximum pressure. Alternatively, the distensible members may be pressurised by a gas of different composition from the incoming gas mixture. Another alternative is to use a hydraulic liquid to pressurise the distensible members.

Yet a further alternative is to use a suitable heat transfer fluid to pressurise the distensible members. This alternative has particular utility in the case of PSA systems for the production of oxygen. It is known in oxygen, PSA pressure vessels for large temperature differences in the order of 20° C. to 80° C. to exist between the pressure vessel inlet and the centre of the bed of particulate molecular sieve. The use of the distensible members filled with heat transfer fluid, for example, silicon oil can effect temperature equalisation as well as restraining the particulate material.

The distensible members are preferable formed of plastics material. They are typically elongate members some of which are preferably of different length from the others. Preferably, at least some of the members extend from near the top to near the bottom of the bed. They may for example take the form of plastics hose closed at its distal end.

The plastics hose is preferably of a shape such that it has flat sides.

Since there is a greater tendency for the adsorbent at the top of the bed to move in operation of the apparatus, it is preferred that some of the distensible members extend only a relatively short distance into the bed say up to one third of the length of the bed from the top.

The apparatus according to the invention enables the particles of adsorbent to be able to be restrained against translation during the various operations that they are subjected to while administering to them only a relatively small compressive force thereby minimising the risk of the particles being crushed. The apparatus according to the invention may be employed in a fast cycling pressure swing adsorption process or in any other pressure swing adsorption process. It may alternatively be used in other adsorption processes or indeed any process in which a gas is passed through a bed of particulate material.

BRIEF DESCRIPTION OF DRAWINGS

The apparatus according to the invention will now be described by way of example by reference to the accompanying diagrammatic drawing, in which:

FIG. 1 is a schematic side elevation partly in cross section of an apparatus according to the invention; and FIG. 2 is a cross-section through the line 1—1 shown in FIG. 1.

DESCRIPTION OF PREFERRED EMBODIMENT

Referring to the drawing, there is shown a generally columnar pressure vessel 2 having flanges 4 and 6 at its top and bottom respectively and closures 8 and 10 are provided with gas ports 12 and 14 respectively. The gas ports 12 and 14 each terminate in a filter 16 adapted to remove all but the finest particles from the gas. A bed 18 of adsorbent material is maintained within the vessel 2. Retaining grids 20 and 22 are provided at the top and bottom of the bed respectively. A manifold 24 is located in the vessel 2 above the top retaining grid 20.

The manifold 24 communicates with a conduit 26 that extends through the closure 8 and terminates in a source of pressurised fluid which in the example of an apparatus for separating air by pressure swing adsorption may be the air compressor of that apparatus. The manifold 24 receives several (eg seven) elongate distensible members 30 which are each closed at their respective distal ends and which are typically formed of a plastics material. The members 30 are each of the cross-section as shown in FIG. 2 having flat sides 42 and 44. The members 30 extend downwards (as shown) into the bed 18 from the manifold 24 generally parallel to the longitudinal access of the vessel 2. Typically, approximately half the members 30 extend a third of the way down the bed 18 while the remainder extend substantially to the bottom of the bed 18.

In operation, the manifold 24 is connected to a source of pressure which is a little higher than the maximum pressure experienced in the vessel 2. The application of this pressure will cause the members 30 to distend and will therefore act to restrain translation of the particles. Typically, in operation of the vessel as part of a pressure swing adsorption apparatus, the pressure in the vessel 2 will cycle between the product pressure and atmospheric pressure, but the pressure in the members 30 may be maintained constant. In the event that the adsorbent material does move, then the members 30 will tend to distend taking up the space and restraining further movement.

If desired, and particularly for oxygen producing PSA pressure vessels the pressure in the manifold 24 may be created by connecting the conduit 26 to a reservoir 32 of heat transfer fluid. The reservoir 32 may be supplied with the heat transfer fluid through a supply pipe 34 having an isolating valve 36 and a non-return valve 38 disposed therein. The reservoir 32 may be provided with a pressure gauge 40 which gives a visual indication of the pressure prevailing in the reservoir 32.

We claim:

1. Gas treatment or separation apparatus including at least one vessel which contains a bed of particulate material and which has at least one gas inlet and at least one gas outlet, wherein the bed receives a plurality of distensible hollow members extending generally longitudinally of the bed, said members being able to be placed in communication with a source of fluid under pressure.

2. Apparatus as claimed in claim 1 for separating a gaseous mixture by pressure swing adsorption, additionally including a compressor to compress the incoming gas mixture, wherein the distensible members communicate directly with the outlet of the compressor.

3. Apparatus as claimed in claim 1, in which the distensible members are connected to a pressurised source of a gas mixture of different composition from the gas mixture to be separated.

4. Apparatus as claimed in claim 1, additionally including hydraulic means for pressurising the distensible members.

5. Apparatus as claimed in claim 1, wherein the distensible members are pressurised by a heat transfer fluid.

6. Apparatus as claimed in any one of claims 1-5, wherein the distensible members are formed of plastics material.

7. Apparatus as claimed in any one of claims 1-5, in which the distensible members are elongate.

8. Apparatus as claimed in claim 7, in which some of the distensible members are of different length from the others.

9. Apparatus as claimed in any one of claim 1-5, wherein each distensible member comprises a plastics hose of a shape such that it has flat sides.

* * * * *